United States Patent
Spiro (10) Patent No.: US 12,503,825 B2
(45) Date of Patent: Dec. 23, 2025

(54) FOUNDATION STRUCTURAL DESIGN WITH CELLS CONFIGURED TO REDIRECT AND DISTRIBUTE STRESS LOADS

(71) Applicant: Exposure Illumination Architects, Inc., Scottsdale, AZ (US)

(72) Inventor: Daniel S. Spiro, Scottsdale, AZ (US)

(73) Assignee: EXPOSURE ILLUMINATION ARCHITECTS, INC., Scottsdale, AZ (US)

( * ) Notice: Subject to any disclaimer, the term of this patent is extended or adjusted under 35 U.S.C. 154(b) by 319 days.

(21) Appl. No.: 18/092,591

(22) Filed: Jan. 3, 2023

(65) Prior Publication Data

US 2023/0220647 A1 Jul. 13, 2023

Related U.S. Application Data

(60) Continuation-in-part of application No. 16/715,908, filed on Dec. 16, 2019, now Pat. No. 11,555,287, which is a division of application No. 16/200,899, filed on Nov. 27, 2018, now Pat. No. 10,724,202, which is a continuation-in-part of application No. 15/722,910, filed on Oct. 2, 2017, now Pat. No. 10,280,581, which is a continuation of application No. 15/404,051, filed on Jan. 11, 2017, now Pat. No. 9,777,456.

(60) Provisional application No. 62/590,837, filed on Nov. 27, 2017.

(51) Int. Cl.
*E02D 27/42* (2006.01)
*E04H 12/22* (2006.01)
*G06F 30/13* (2020.01)
*G06F 111/10* (2020.01)

(52) U.S. Cl.
CPC ......... *E02D 27/42* (2013.01); *E04H 12/2269* (2013.01); *E04H 12/2284* (2013.01); *E04H 12/2292* (2013.01); *G06F 30/13* (2020.01); *E02D 2300/00* (2013.01); *E02D 2600/00* (2013.01); *G06F 2111/10* (2020.01)

(58) Field of Classification Search
CPC . E02D 27/42; E02D 2300/00; E02D 2600/00; E04H 12/2269; E04H 12/2284; E04H 12/2292; G06F 30/13; G06F 2111/10
See application file for complete search history.

(56) References Cited

U.S. PATENT DOCUMENTS

| | | |
|---|---|---|
| 1,611,935 A | 12/1926 | Mitchell |
| 1,799,314 A | 4/1931 | Pfaff |
| 2,784,015 A | 3/1957 | Swanson |
| 5,632,464 A | 5/1997 | Aberle |

(Continued)

OTHER PUBLICATIONS

Svensson, Henrik, "Design of Foundations for Wind Turbines", 2010, Structural Mechanics, LTH, Sweden. (Year: 2010).

(Continued)

*Primary Examiner* — Patrick J Maestri
(74) *Attorney, Agent, or Firm* — XSENSUS LLP (57) ABSTRACT

A structural design of a foundation that is configured to reduce size, fabrication time, material usage and installation time by prefabricated machine produced structural cellular and/or volumetric design that distributes and redirects stress loads from the above over extended exterior surface contact areas of a below grade embedded foundation.

19 Claims, 8 Drawing Sheets

SECTION A-A

(56) References Cited

U.S. PATENT DOCUMENTS

| | | |
|---|---|---|
| 6,494,643 B1 | 12/2002 | Thurner |
| 7,556,752 B1 | 7/2009 | Hicks |
| 7,694,487 B1 | 4/2010 | Ryan |
| 7,765,770 B2 | 8/2010 | Fournier |
| 7,954,289 B2 | 6/2011 | Evans |
| 8,714,511 B2 * | 5/2014 | Zoeteman ............... A45B 11/00 248/537 |
| 8,966,837 B2 | 3/2015 | Knudsen |
| 9,616,910 B2 * | 4/2017 | Chaloux ................ A45C 15/00 |
| 9,663,939 B2 * | 5/2017 | Seidel .................... E04H 12/22 |
| 9,777,456 B1 | 10/2017 | Spiro |
| 10,006,178 B2 * | 6/2018 | Intagliata ................ E01F 9/629 |
| 10,280,581 B2 | 5/2019 | Spiro |
| 10,745,931 B1 * | 8/2020 | Gathers ............... E04H 12/2269 |
| 11,466,414 B2 * | 10/2022 | Hughes, Jr. ............. E01F 9/608 |
| 2001/0029432 A1 | 10/2001 | Gidwani |
| 2003/0145556 A1 | 8/2003 | Young |
| 2005/0051695 A1 | 3/2005 | Kovach |
| 2006/0104715 A1 | 5/2006 | Newton |
| 2007/0022706 A1 | 2/2007 | Fournier |
| 2009/0025332 A1 | 1/2009 | Richards |
| 2010/0277290 A1 | 11/2010 | Knudsen |
| 2013/0212966 A1 | 8/2013 | Knudsen |
| 2013/0232780 A1 | 9/2013 | Penfold |
| 2018/0195305 A1 | 7/2018 | Bishop, III et al. |
| 2020/0271101 A1 * | 8/2020 | Voss .................... E04H 12/2269 |
| 2020/0378079 A1 * | 12/2020 | Beason .................... E01F 13/00 |

OTHER PUBLICATIONS

Al Hamaydeh, Mohammad et al., "Optimized Frequency-Based Foundation Design for Wind Turbine Towers Utilizing Soul-Structure Interaction", Apr. 24, 2010, Journal of the Franklin Institute 348, Elsevier Ltd. (Year: 2010).

Spiro, Daniel S. Universal Pole Foundation, Patent Cooperation Treaty Application Serial No. PCT/US2018/13148, filed Jan. 10, 2018, International Search Report and Written Opinion dated May 1, 2018.

https://www.satelliteguys.us/xen/threads/mounting-dish-in-a-bucked-of-concrete.20219/ (Year:2004).

https://web.archive.org/web/20070120094657 /http://www.wikihow.com/Installl-a-Temporary-Mail-Box-Without-a-Post-Hold-Digger (Year: 2006).

* cited by examiner

FOUNDATION STRUCTURAL DESIGN WITH CELLS CONFIGURED TO REDIRECT AND DISTRIBUTE STRESS LOADS

CROSS-REFERENCE TO RELATED APPLICATIONS

This application is a continuation-in-part application of the earlier filed U.S. Utility patent application entitled "CELLULAR AND BALLASTED UNIVERSAL POLE FOUNDATION," application Ser. No. 16/715,908, filed Dec. 16, 2019, which is a divisional of the earlier U.S. Utility patent application entitled "CELLULAR AND BALLASTED UNIVERSAL POLE FOUNDATION," application Ser. No. 16/200,899, filed Nov. 27, 2018, now U.S. Pat. No. 10,724,202, which is a continuation-in-part of the earlier U.S. Utility patent application entitled "UNIVERSAL POLE FOUNDATION," application Ser. No. 15/722,910, filed Oct. 2, 2017, now U.S. Pat. No. 10,280,581, which is a continuation of the earlier U.S. Utility patent application entitled "UNIVERSAL POLE FOUNDATION," application Ser. No. 15/404,051, filed Jan. 11, 2017, now U.S. Pat. No. 9,777,456, and application Ser. No. 16/200,899 claims priority to U.S. Provisional Patent Application having Ser. No. 62/590,837, filed Nov. 27, 2017, the entire disclosures of each of which are hereby incorporated by reference in their entireties.

BACKGROUND

Technical Field

The present disclosure is directed to foundation structures for vertical poles, such as streetlights, cellular towers, and the like.

Discussion of Background

Conventional structures often have a plate that is welded to a base of a pole, which in turn is then bolted to a base that is either flat on the ground, or an elevated pylon structure. Alternatively, a bottom portion of the pole may be placed in a void formed in the ground, or hollowed pylon, and then set, and held in place, with a poured material, such as concrete.

SUMMARY

Non-limiting aspects of the present disclosure include the following features:
- A foundation fabricated of internal cellular structures or internal cellular structures with at least one volumetric enclosure.
- A pole cap that also covers a pole cavity configured to couple and secure a pole to a foundation while distributing at least a portion of the pole's stresses onto the inner pole cavity walls of the foundation structure.
- A structural vertical cellular wall radiating pattern inside the foundation's walls that is configured to originate about the central vertical axis of the foundation.
- A structural vertical cellular wall spiraling design pattern inside the foundation's wall that originates from the top of a pole cavity wall downwardly.
- A unitarily fabricated foundation comprising cellular structures configured to reduce the foundation's weight and material used by at least 5% of a solid material like foundation.
- A unitarily lightweight foundation that is rapidly fabricated and installed.
- A unitarily fabricated foundation that above grade tapers inwardly.
- A structural design by means of vertical walls to relief stresses applied on a foundation by extending the exterior surface area of the foundation.

Moreover, in earlier US patents, cited in the Cross-Reference section of this application, the applicant described a cellular foundation structure having at least one volumetric enclosure. These applications also described using additive technology as a way of fabrication, where the additive technology enables the fabrication of complex forms with a high degree of precision tolerances. These earlier patent documents describe a tapered pole axial load primarily exerted onto the pole's tapered structure. The tapered structure is a protruded extension centrally located at the bottom of the pole cavity of the foundation. Where a straight pole shaft is used, the tapered structure, or a non-tapered structure can be used to vertically align the pole. In yet another embodiment, no tapered structure is needed, or a recess in the foundation can provide an anchoring location to vertically align the pole.

The cap located in proximity to the pole cavity top of the foundation secures the pole to the foundation. The cap is configured to bridge the gap between the exterior surface of the pole and the pole cavity's inner wall. The cap's structure can be configured to transfer at least a portion of the pole's the lateral/moment stresses onto the pole cavity walls of the foundation. The cap can also provide a moisture barrier preventing fluid from entering the pole cavity. Further, in at least one embodiment the space between the bottom of the pole cavity and the bottom of the pole cap can be partially or fully filled with granular fill material.

The present disclosure further describes a foundation product that can be designed by finite code capable of designing complex structural forms and becoming economically feasible only through additive technology fabrication. As a result, and in comparison with traditional concrete pole foundation production, the present foundation innovation reduces material usage, production time, production costs, handling costs, shipping costs, installation costs, and carbon emissions.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

Before, addressing the drawings in detail, a brief overview of a cellular or cellular and volumetric pole foundation design according to the present disclosure is in order. Recent developments in additive technology fabrication machinery and material science have made the fabrication of a complex formed structure possible. In so doing, it has made the production of complex formed structural design economically feasible. The present innovation teaches and shows at least one such complex form cellular structural design with at least one sub-variation of the base design.

In earlier members of the present patent family, the applicant established that the foundation's cellular structure is located between the inner and outer walls of the foundation. The walls of the foundation are configured to distribute the stresses applied by the pole with its coupled device/s to the foundation's exterior surrounding.

Therefore, the outer wall of the foundation must be configured to withstand impact by external object/s, pressure by a sharp and/or small surface object/s, extreme temperatures, fire and/or corrosive environment/s. For these reasons, the present disclosure accounts for the foundation's wall/s and more specifically the exterior wall of the foundation to vary so as to withstand counter stresses applied on the wall's surface/s by the surrounding environment.

Figure 6A:
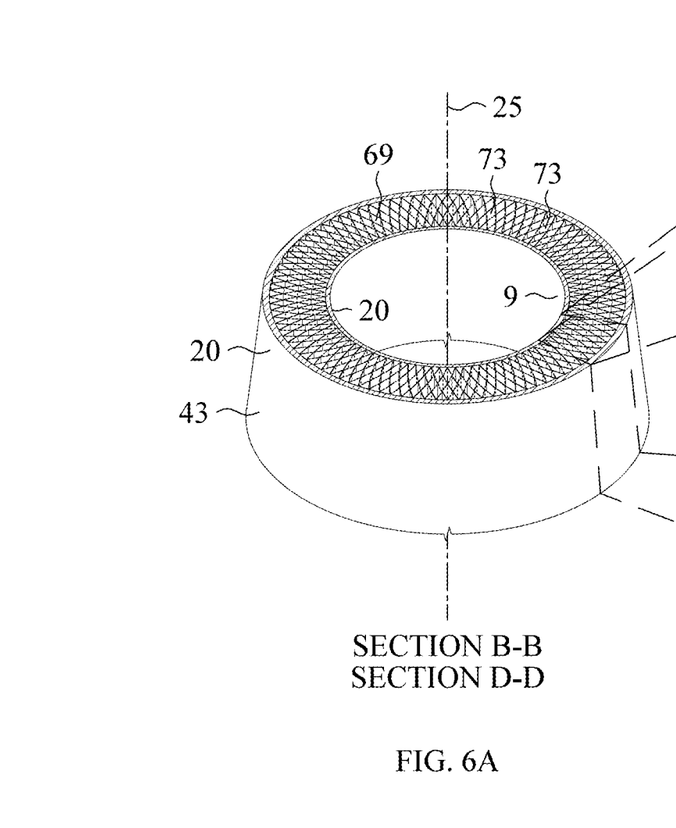
FIGS. 6A and 6B show horizontal sections through a pole cavity of a tapered foundation and a partial perspective enlargement of a section of the pole cavity.

As a brief introduction of aspects of the present teachings, before turning to detailed description of each figure, the present innovation teaches and shows a foundation 1 (FIG. 1) structure with several vertical walls that form cells 73 (FIG. 6A) configured to be unitarily formed. The cellular vertical (curved) walls 69 (FIG. 6A) forming the structure cells 73 are located between the inner 41 and outer 43 walls (FIG. 6B) of the foundation's 1 pole cavity 9 (FIG. 6A). The cellular structure is formed by intersecting vertical cellular walls 69 is arranged in a radial pattern about the vertical axis of the foundation 1. The repeated pattern is formed by the arrangement of the clockwise and counter-clockwise vertical curved walls 69.

Figure 6B:
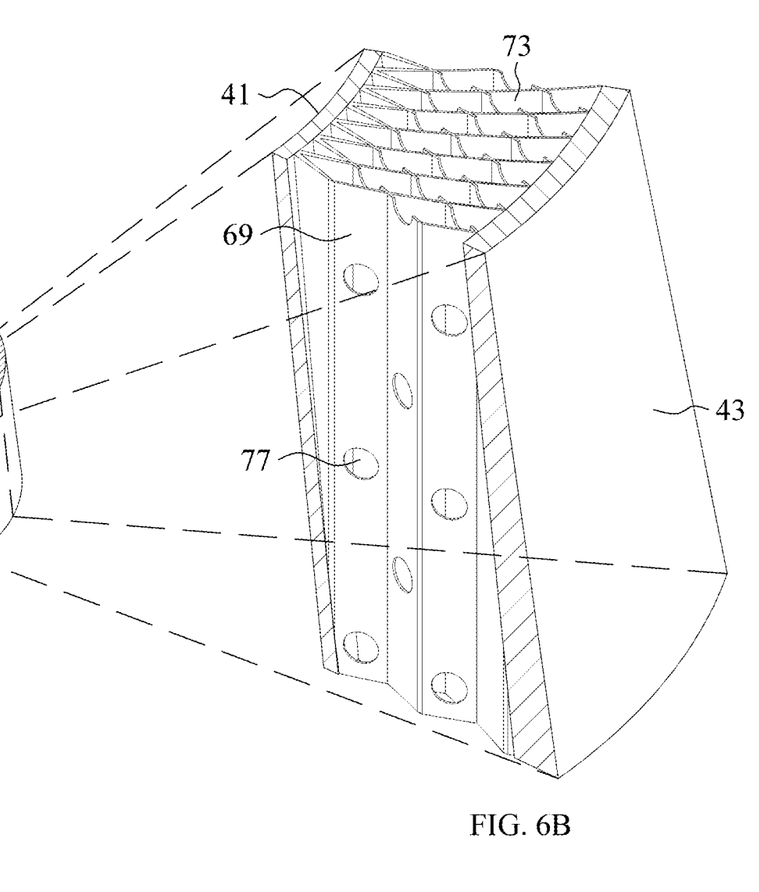

Extending between the inner 41 and outer 43 walls of at least the pole cavity 9, the vertical cellular walls 69 radiate outwardly about the vertical axis of the foundation 25. In at least one embodiment, a thickness of vertical cellular walls 69 can vary from one end to the other. Further, the vertical cellular walls 69 can have at least one opening 77 (FIG. 6B). Fluid can flow to at least one adjacent cell 73 through such an opening in the vertical cellular wall 69. When additional weight is required to ballast a foundation 1, fluid dispensed from a fluid inlet in the pole cavity 9 above can fill the plurality of the foundation's 1 internal cells 73 or the cells 73 and the voids in the volumetric structure 55 (FIG. 8B).

In at least one embodiment, the outwardly radiating vertical cellular walls 69 can curve to form a sunflower pattern. As they walls intersect, the vertical cellular walls 69 form a plurality of cells 73. As the vertical cellular walls 69 extend toward the foundation's 1 and/or the pole cavity exterior/outer wall 50 (FIG. 2A), the cell 73 sizes increase. The diverging vertical cellular walls 69 are coupled to the foundation's 1 and the pole cavity 9 exterior wall 50. Stresses applied by the pole 22 (FIG. 2A) are conveyed through the diverging cellular walls 69 to the foundation's exterior surfaces 50. Since the walls 69 diverge, the stresses applied on them by the pole 22 are distributed over an extended areas of the foundation's exterior surface. As a result, to maintain the foundation in equilibrium, the counter pressure needed to apply by the surrounding medium on the foundation's 1 exterior surfaces is reduced.

In a different embodiment, the radial formed vertical cellular walls 69, or the sunflower formed vertical cellular curved walls 69 can spiral from the top of the pole cavity 9 down and about the vertical central axis of the foundation 25. The radial and the sunflower formed design of the vertical cellular walls 69 employing the spiral form design further enlarges extends the surface contact area of the pole cavity/foundation 9, 1 and in some cases re-directed stresses results help counter balancing stresses.

Fabricating the cellular walls 69 of the foundation 1 by way of additive technology has an added advantage over alternate technologies. Pre-configured openings in the celled walls 69 can reduce the material usage and the foundation's weight by at least 5% without compromising the cell's foundation's 1 structural integrity. In addition, in at least one embodiment, openings in the vertical cellular walls 77 allow for fluid to flow between adjacent cells 73. It is noted that when additional ballasting weight is needed to ballast the foundation 1, fluid can be poured into an inlet located behind a fluid enclosure cover 80 disposed on the exterior wall 50 of the pole cavity 9.

Aspects of the Pole Cap—The unitarily formed pole cavity 9 of the cellular foundation 1 is configured to receive a pole 22. The pole 22 can have a straight or tapered shaft. While a straight shaft pole 22 can be coupled directly to the foundation's pole cavity 9 without a pole cap 100 (e.g., FIG. 5A), a tapered pole 22 requires a pole cap 100. The pole cap 100 can be unitarily fabricated of a single member 99 (e.g., FIG. 5c) or can be fabricated to comprise a plurality of members 99 configured to join. The pole cap 100 can be fabricated of solid and hardened material and/or as with the foundation 1, can have inner 85 and outer 83 walls (FIGS. 5A and 5B) with cells 73 between.

The pole cap 100 provides several utilities:

The pole cap conveys a portion of the pole's stresses with its coupled device/s to the inner walls of the pole cavity.

The pole cap anchors the pole to the foundation.

The pole cap with the anchor bolt prevents the pole from rotating about its vertical axis and resists uplift wind forces.

The pole cap covers at least a portion of the pole cavity preventing fluid from entering the pole cavity.

The pole cap diverts fluid away from the cap pole opening toward the foundation's exterior.

Figure 5A:
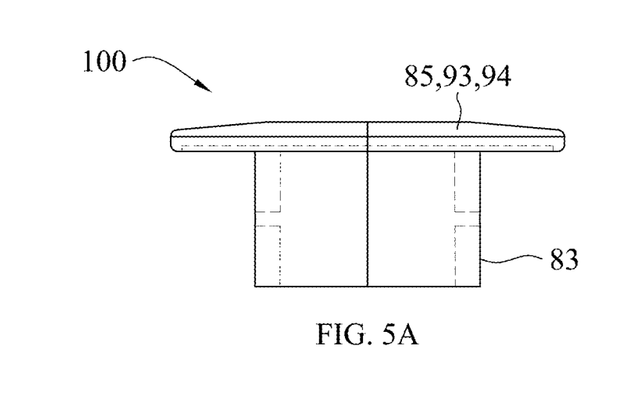
FIGS. 5A, 5B, 5C, and 5D show an elevation, a section, a top view, and a bottom view of a pole cap, respectively.
Figure 5B:
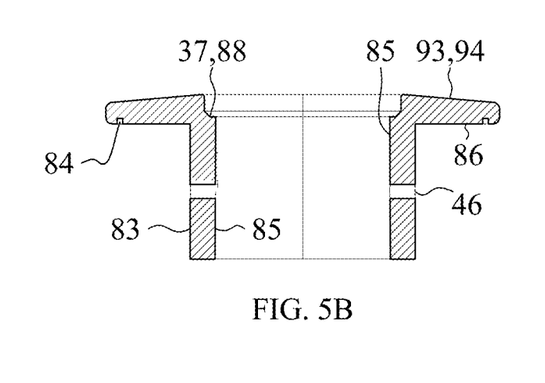

In at least one embodiment the pole cap's cover 94 (FIG. 5A) can be fabricated to have an overhanging lip 86 (FIG. 5B). The overhanging lip 86 can extend beyond the vertical wall face of the pole cavity 9. The top surface of the cap cover can have a built-in slope 93 to direct fluid away from the pole's outer perimeter. The cap's inner wall/s forming an opening is/are configured to couple to the outer wall of the pole also referred herein as the pole inner wall 85 opening. A recess 88 in the pole cap's inner 85 opening on top is configured to receive elastomeric compound 37 (FIG. 1) to seal any gaps that could allow fluid to enter the pole cavity 9.

It is noted that the pole cap 100 dimensions are set in relation to specific pole 22 types as advertised disclosed by manufacturers. That said, the poles' 22 dimensions and tolerances are clearly defined by the manufacturer, enabling the precise fabrication of the pole cap 22 to couple to the exterior wall/s surface/s of the pole 22. The pole 22 to foundation coupling method by way of the pole cap 100 with integral cover 94 is possible due to:

The pole 22, the pole cap 100 and the pole cavity 9 materials are stable against thermal expansion.

The manufacturer pole with coupled devices data, the geotechnical/environmental data and jurisdiction building code information are available online and/or can be manually retrieved and inputted.

The code configuring the pole cap's 100 dimensions concurrently configures the foundation 1 dimensions, and more specifically the precise dimensions of the pole cavity 9 inner walls 41, the walls to which the pole cap's 100 vertical outer walls 83 couple to.

The pole cap 100 can have at least one through bore 46 (FIG. 5B) configured to secure the pole 22 to the foundation's pole cavity 9. The bore 46 can be threaded or non-threaded and at least in part dimensionally correspond to a threaded or non-threaded bore 46 in the wall of the pole cavity 9 and/or the pole cap 100. In at least one embodiment, before the pole cap 100 is placed in to over the pole cavity 9, a pole 22 can be oriented per plan and then a bore 46 can be drilled through at least one wall of the pole 22. Then, the pole cap 100 can be inserted into the pole cavity 100 with its bore 46 aligned with the bore/s 46 of the pole 22. Then, a threaded bolt 48 (FIG. 2A) inserted from the exterior wall of the pole cavity 50 can couple and secure the pole 22 to the pole cap 100 and the foundation 1. The bolt 48 can extend from the exterior wall of the pole cavity 50 to beyond at least one wall of the pole 22 or through the pole 22 from one end of the pole cavity exterior wall 50 to the other.

Inward Tapering Foundation Structure—The legacy pole foundation most commonly rests on a concrete foundation. The foundation is poured in place or is pre-casted. Threaded bolts extend from the concrete foundation top surface upwardly. The reciprocating bores in the pole's base plate are configured to receive the threaded bolts from below. Once the pole base plate rests on the foundation, the ends of the threaded bolts extend above the pole's base plate and are secured by nuts coupling the pole to the concrete foundation.

Since the major portion of the anchor bolts of the legacy concrete pole foundation are embedded in the concrete foundation and to prevent moisture penetration causing rusting, the bolts' elongated structure must be disposed no less than 1.5" from the exterior perimeter walls of the foundation. As a result, the diameter of the foundation is dictated by the bolts' arrangement. The larger the anchor bolts diameter with their corresponding circle diameter, the larger is the foundation's diameter.

By contrast, the pole foundation 1 of the present innovation is configured to retain a portion of the pole 22 inside a pole cavity 9. As little as a single horizontally installed anchor bolt 48 can secure the pole 22 to the foundation 1. The anchor bolt 48 can be made of metallic or non-metallic material and may not require any additional material to protect it from corrosion. Unlike the concrete embedded anchor bolts, the present innovation substantially horizontally installed bolt/s 48 does not define the diameter of the foundation 1. Therefore, tapered wall foundations 50 can replace the traditional straight wall concrete formed pole base foundations.

The foundation's 1 monolithic structure from at least grade level up can taper inward toward the central vertical axis of the foundation 25. Tapering the pole cavity 9 walls of the foundation 1 inward reduces material used in fabrication, reduces production time, reduces fabrication costs, and reduces physical obstructions, thus increasing usable space above grade. By Through limiting the structural dependency on anchor bolts 48 to only secure the pole 22 and not carry a pole's 22 weight while extending the foundations exterior surface contact areas through stress redirection with or without a pole cap 100, the foundation's assembly installation process is simpler and faster with minimal exposure to corrosion risks.

Since tapered pole foundations have a smaller diameter on top, the tapered pole foundation assembly reduces material and labor costs while enhancing the streetscape and illuminated areas' architecture.

Figure 1:
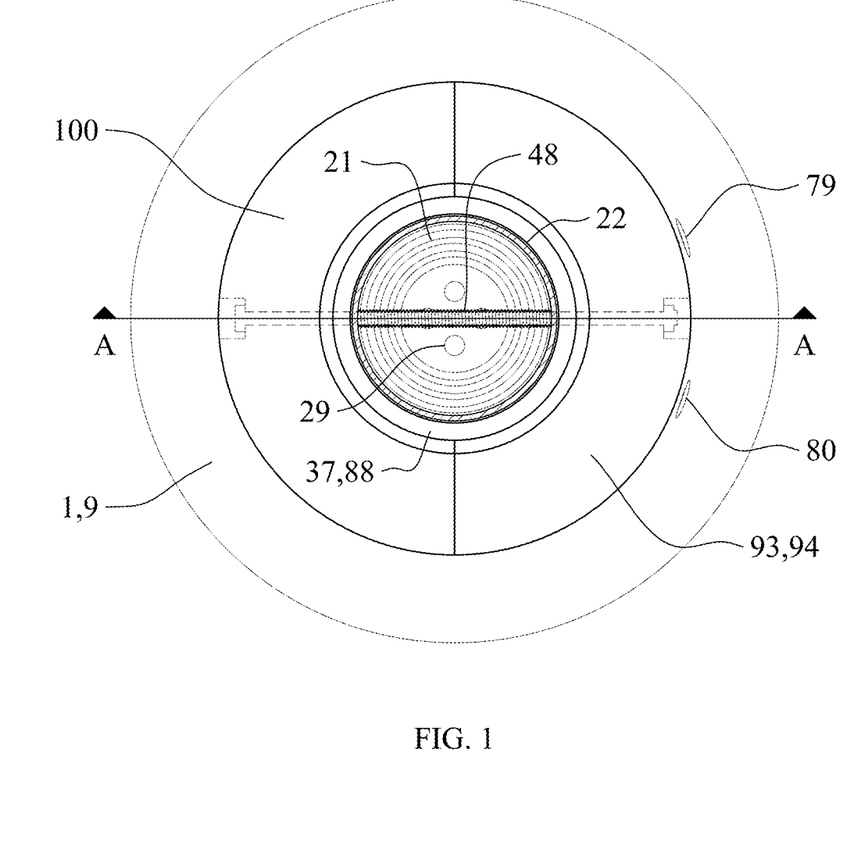
FIG. 1 shows a top view of a tapered foundation retaining a tapered pole that is coupled to the tapered foundation by a cap.

Turning now to detailed descriptions of specific figures, FIG. 1 shows a top view of the foundation retaining a tapered pole 22 that is coupled to a tapered foundation by a pole cap 100.

The pole cap 100 with at least one bolt 48 provides the means to safely couple, and retain, a pole 22 to the foundation 1. The prefabricated pole cap 100 can be comprised of at least one member. The pole cap 100 shown in FIG. 1 is comprised of two members connected by a reciprocating seam. The two members are designed to couple to the pole's exterior perimeter walls and to the inner walls of the pole cavity 9. The pole cap's 100 unitarily formed inner and outer walls 85,83 extend upwardly and outwardly, providing a cover 94 for the pole cavity 9. The pole cap cover 94 extends from the proximity of the pole's 22 exterior perimeter to beyond the outer perimeter wall of the pole cavity 9, or to over at least a portion of the pole cavity 9 top surface (not shown in FIG. 1).

A computer-based process may be used to set the dimensions of the foundation. As the processor code, upon execution by the processor, configures the dimension of the foundation design, the code determines the length, thickness, and diameter of the inner and outer vertical walls of the pole cap 100. The code also determines the diameter of the pole cap cover 94 and the pole cap's 100 top surface slope 93. Since the dimensions of the entire assembly are known, the pole cap 100 inner vertical walls can be fabricated to precisely couple to the pole's 22 exterior perimeter walls, and the pole cap's 100 outer vertical walls can be fabricated to precisely couple to the inner walls of the pole cavity 9.

Once the pole 22 is seated inside the pole cavity 9 and oriented per plan, the pole cap 100 plumbs the pole by coupling to the pole 22 and the pole cavity 9 walls. A bolt 48 (shown in dashed line) bolted from an exterior pole cavity 9 wall through the pole cap 100 extends into at least one wall of the pole 22. The bolt 48 secures the pole 22 to the foundation 1 by preventing the pole 22 from rotation and resisting wind up-lift forces. In this figure, the bolt 48 is shown extending from one end to the other end of the exterior walls of the pole cavity 9. In another embodiment, more than a single bolt 48 can be used.

The pole cap 100 can be configured to prevent fluid from entering the pole cavity 9 by at least three mechanisms. The first is by a slope 93 originating on top in the proximity of the inner perimeter of the pole cap 100 and descending toward the outer perimeter of the pole cavity 9. The second is by a continuous recess 88 in the top inner perimeter of the cap between the peak of the slope 93 and exterior perimeter of the pole. After the pole cap 100 is seated inside the pole cavity 9 and secured by a bolt 48, the continuous recess is filled with an elastomeric compound 37. The third is a continuous groove (groove 84 as later shown in FIG. 5B) at the bottom surface of the pole cap 100 pole cavity cover 94. The groove prevents fluid from back flowing between the pole cap's 100 cover 94 and the top of the pole cavity surfaces. Where driving rain conditions exist, a gasket can also be place between these two elements.

Other elements shown include electrical enclosure cover 79, fluid enclosure cover 80, conduits/conductors 29, and a tapered structure 21 the pole section sits on. Moreover, the tapered structure 21 includes a projection with steps on it outer sides. The inner walls of the pole 22 match a base of the tapered structure 21 so the base of the pole is held in place by virtue of it being fitted over the tapered structure 21.

Figure 2A:
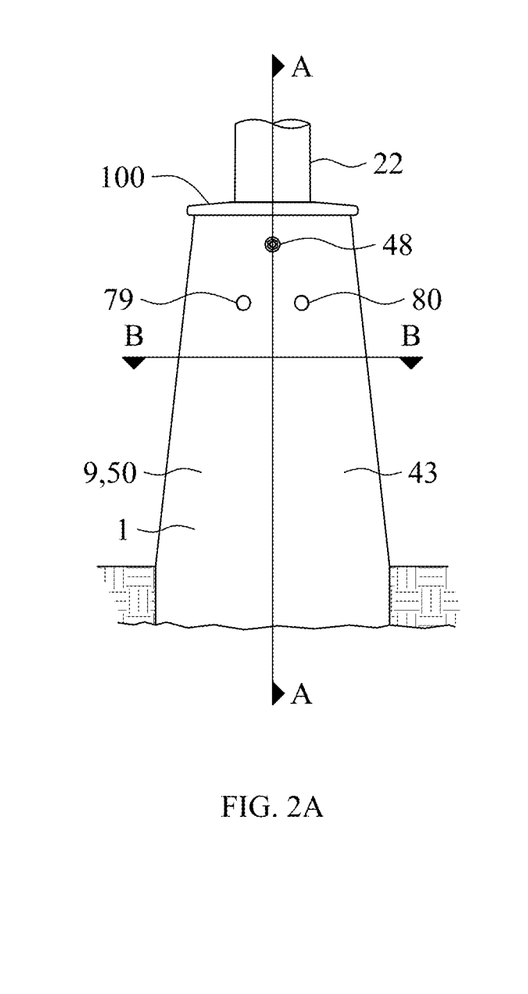
FIGS. 2A and 2B show a partial elevation and a partial section of a pole foundation with a pole received therein that is coupled to the foundation by a cap, respectively.
Figure 2B:
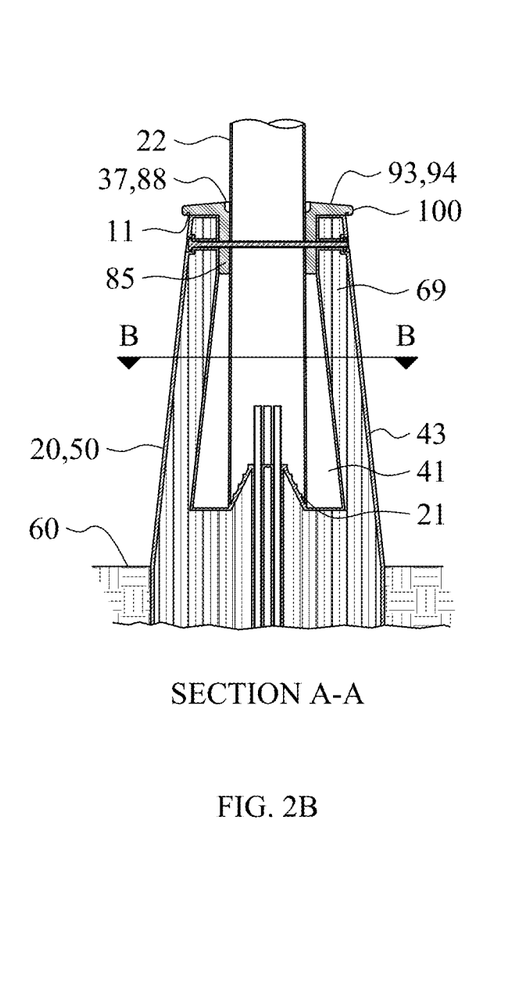

The Section A-A designator refers to a vertical section through the pole foundation shown in FIGS. 2a and 2b.

FIGS. 2a and 2b show a partial elevation and a partial section A-A of a pole foundation with a tapered pole coupled to the foundation by a pole cap, respectively.

FIG. 2a shows the partial elevation of top of foundation 1 with a coupled section of a tapered pole 22 extending upwardly above a pole cap 100. The foundation's pole cavity exterior walls 43 are shown tapering inward, as viewed from below, toward the vertical axial center of the foundation 1 with a coupled pole 22 from above. The pole 22 is secured to the foundation by the pole cap 100. A bolt 48 shown just below the pole cap 100 secures the pole 22 with the pole cap 100 to the foundation 1.

Covers 79, 80 shown disposed on the exterior walls of the pole cavity 9 can provide access to at least one of: a fluid fill inlet and/or a power/data receptacle. Below the bolt's bore, the figure shows an electrical enclosure cover 79 for an electrical receptacle and an enclosure cover for a fluid inlet 80. When the foundation 1 requires extra weight for ballasting, fluid can be poured through the inlet filling at least in a portion of voids in the vertical cellular walls and/or spaces inside the volumetric enclosure/s of the foundation 1.

Next to the fluid inlet cover 80, an electrical enclosure cover shown enables coupling electrical devices to at least one power conductor in the foundation. For example, an electrical vehicle plug can be coupled to a receptacle behind the electrical enclosure cover 80. Inside the foundation's 1 walls, the cellular wall can be formed to have through fluid and/or power conduits. The conduits can extend between the exterior and/or the interior walls of the foundation thereby allowing conveyance of fluid and/or electrical conductors to or to and from the foundation's 1 interior to the exterior (not shown).

The foundation's tapering walls 50 can be articulated with at least one of: a prefabricated reveal and a recess. In addition, the foundation's exterior surfaces 50 can be painted and/or can be coupled to a laminate. The foundation 1 material can be non-corrosive, non-metallic, can emit little or no harmful gases to the atmosphere, and can withstand the elements in the environment where installed. Further, at least a portion of the materials of the foundation's exterior walls 50 can be different from the materials used to fabricate the interior and can be applied and/or fabricated as a secondary fabrication process.

FIG. 2b shows section figure the upper end of the foundation's top extending upwardly from the terrain below. The tapered pole 22 is shown to be fitted over and seated on a tapered structure 21 located at the bottom of the pole's cavity 9. The pole section is shown supported by a pole cap 100 at the top of the pole cavity 11. The size and form of the tapered structure and the pole cap can be concurrently configured by the design and fabrication code according to the teachings in U.S. Pat. No. 11,555,287 and/or custom designed.

The processor of the design code can obtain manufacturers' online approved pole dimensions including profile and weight, can calculate the applied loads including geotechnical and environmental data, and can produce at least one straight or tapered foundation 1 structure and pole cap 100 design. To design the foundations' 1 tapered structure the data obtained by the code can include at least one of: the environmental conditions at the future foundation location, local building codes and regulations, and selected engineering/architectural elements. More specifically, the code configuring the foundation 1 and the pole cap 100 structural design obtains at least one preferred pole profile at the bottom, taper angle, dimensions, length of the section inside the pole cavity and total bearing load. Then the code can design the corresponding design for the pole cap 100. The code can configure the overall best design for the pole cavity 9 taper in relation to the selected pole 22 with at least a portion of the pole's 22 lateral loads applied on the pole's cap 100. It is noted that human input can be required for at least one of the following processes: establish design parameters, design review, production budget review, and design approval.

The pole cap's 100 primary tasks are to:
Transfer a portion of the pole stress on to the walls of the pole cavity.
Secure the pole to the foundation.
Stop fluid from entering the pole's cavity.

The pole cap's 100 unitary structure above forms the cover of the pole's cavity 94. The pole cavity cover 94 extends from the proximity of the perimeter walls of the pole 22 outwardly covering at least a portion of the top surfaces of the pole cavity 9. The pole cap cover 94 has a built-in slope 93 to prevent fluid ponding on top. The pole cap cover 94 tapers from the pole cap 100 recess 88 downwardly and outwardly. A shown, recess 88 in the inner vertical wall of the pole cap 85 is configured to receive elastomeric compound 37 after the pole 22 is seated securely inside the pole cavity 9. The elastomeric compound 37 stops fluid from entering the pole cavity 9.

The foundation 1 pole cavity walls 20 are shown tapered inward from the terrain 60 up. A pole cap 100 covering the top surface of the pole cavity 11 secures the pole 22 to the foundation 1 by means of a bolt 48. The present figure shows a through bolt 48 threaded horizontally from the exterior wall of the pole cavity 50. The tapering pole cavity walls 20 are comprised of inner and outer (interior/exterior) walls 41,43 and cellular vertical walls 69 disposed between. The thickness of the inner 41 and outer 43 walls of the pole cavity 9 can vary in response to internal and external stresses applied to the walls. It is noted that the inner vertical walls of the pole cap 85 are code configured to couple to the tapered pole 22 walls and the outer vertical walls of the pole cap 83 are configured, at proximity to the pole cavity 9 top, to couple to the inner wall of the pole cavity 41.

The vertical cellular walls 69 shown disposed between the inner 41 and outer 43 pole cavity walls 20 and/or the entire foundation 1 direct at least a portion of the stresses applied by the pole cap 100 to the inner walls 41 of the pole cavity 9. From the pole cavity inner wall 41 the stresses are conveyed through the cellular vertical walls 69 to the outer walls 43 of the pole cavity 9 and down to the foundation's 1 structure below the terrain 60.

FIG. 2B shows several cellular vertical walls 69. These walls, located between the inner 41 and outer 43 walls of the foundation walls 20, are unitarily formed. These cellular vertical walls 69 intersect, forming a radial pattern when viewed from above about the vertical axis of the foundation. In at least one embodiment the thickness of vertical cellular walls 69 can vary from one end to the other.

Further, the vertical cellular walls 69 can have at least one opening in the wall (not shown). Fluid can then flow to at least one adjacent cell through such an opening in the vertical cellular wall 69. When additional weight is needed to ballast a foundation 1, fluid dispensed from a fluid inlet 80 above can fill voids formed by the vertical cellular walls 69 and/or spaces inside the volumetric opening/s of the foundation 1 (see FIG. 6B).

The diverging vertical cellular walls 69 are coupled to the foundation's perimeter wall 50. Stresses applied by the pole 22 are conveyed through the diverging vertical cellular walls 69 to the foundation's 1 exterior surfaces 43. Since the walls diverge, the stresses are distributed over an extended surface areas of the foundation's exterior 43. As a result, to maintain the foundation in equilibrium, the counter pressure applied by the surrounding medium on the foundation's 1 exterior surface areas is reduced.

Figure 3:
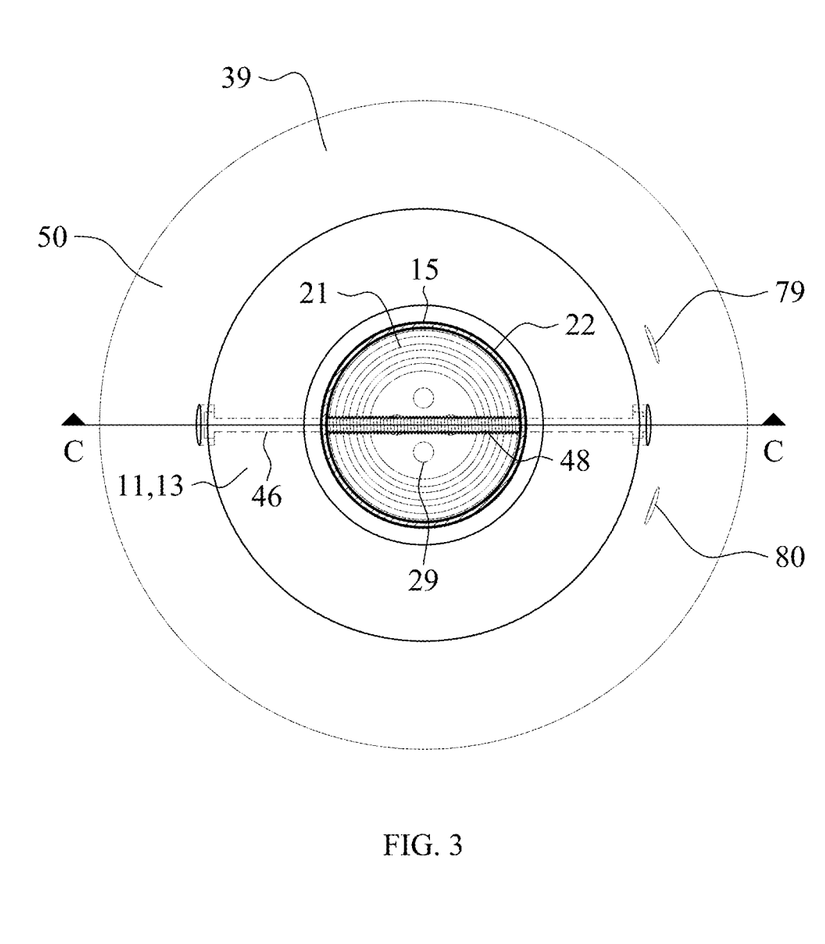
FIG. 3 shows a top view of the foundation retaining a straight shaft pole.

FIG. 3 shows a top view of a tapered foundation retaining a straight shaft pole.

The present figure shows a foundation 1 with tapered pole cavity walls 39 coupled to a straight shaft pole 22 extending upwardly from the central vertical axis of the foundation 1. The pole 22 weight, is at least in part, supported by the tapered structure 21 disposed at the bottom of the pole cavity 9. The pole cavity 9 receiving the pole 22 through the pole cavity opening 15 is configured to precisely complement the profile and dimensions of the pole's 22 exterior perimeter walls. The top surfaces of the pole cavity 11 can be fabricated to include a built-in slope 13 purposed to divert fluid away and toward the exterior side walls of the pole cavity 9.

A prefabricated recess 17 around the pole cavity's 9 pole opening 15 can be configured to receive elastomeric compound 37. The elastomeric compound 37 prevents fluid from entering the pole cavity 9. A through bolt 48 can couple and secure the pole 22 to the foundation 1. The present figure shows a horizontal through bolt 48 extending from one end to the other end of the pole cavity 9. Portions of the bolt 48 are concealed inside the walls of the pole's cavity 9 and are shown in dashed lines. To couple and secure the pole 22 to the foundation 1 at least one bolt 48 must extend from at least on exterior wall of the pole cavity 50 through at least one wall of a pole 22.

The straight shaft pole foundation 1 is plumbed upon installation. Then, an inserted pole 22 with or without coupled devices is correctly oriented. In at least one different embodiment, Marking/s on the foundation can assist installers to properly orient the foundation 1 forgoing on having to orient the pole 22 post the foundation 1 installation. Other elements shown include electrical conduit/s/conductor/s 29 shown extending out from the top surface of the tapered structure 21, electrical enclosure cover/s 79 and fluid enclosure cover/s 80 built into the exterior wall of the tapered pole cavity 9, and a concealed bolt's bore 46 below the tapered walls of the pole cavity top surfaces 11.

The foundation's structural design code configures the profile of the pole opening 15 in the pole cavity 9. The design parameters of a selected pole 22 can include at least the pole's 22 dimensions, profile, and load bearing capacity. The parameters can be inputted by a designer, or the code can be capable of selecting a compatible pole 22. The code can have access to a pole's 22 product data locally stored and/or can access approved selected pole manufacturers' databases online.

To save material and production time, the walls of the pole cavity taper inward 50. The inner opening of the pole cavity walls also referred herein as the pole opening 15 is configured to precisely couple to the outer diameter/profile of the pole 22 selected. The length and thickness of the inner walls of the pole cavity 15 coupling the pole 22 can be configured by the code to sufficiently withstand the stresses applied by the pole 22.

Figure 4A:
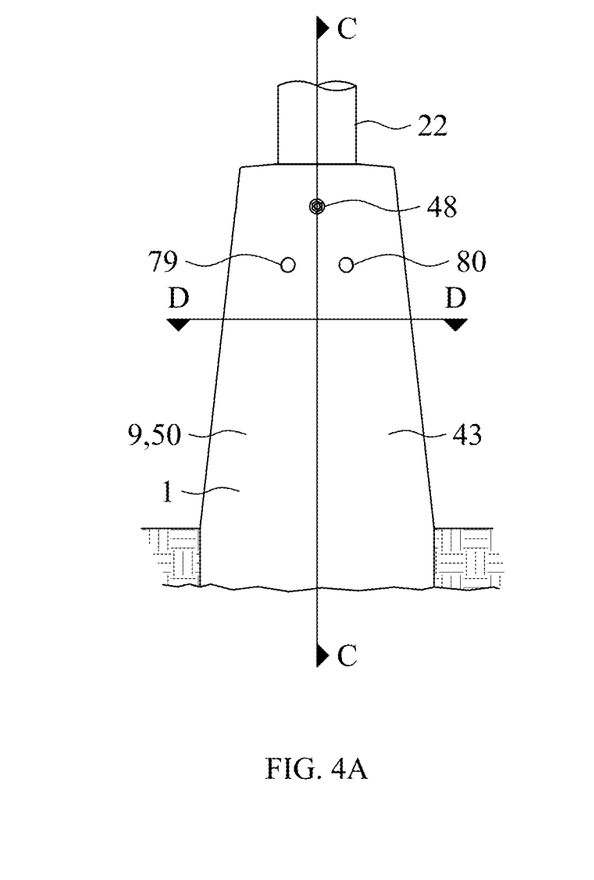
FIGS. 4A and 4B show a partial elevation and a partial section of a pole foundation with coupled straight shaft pole, respectively.
Figure 4B:
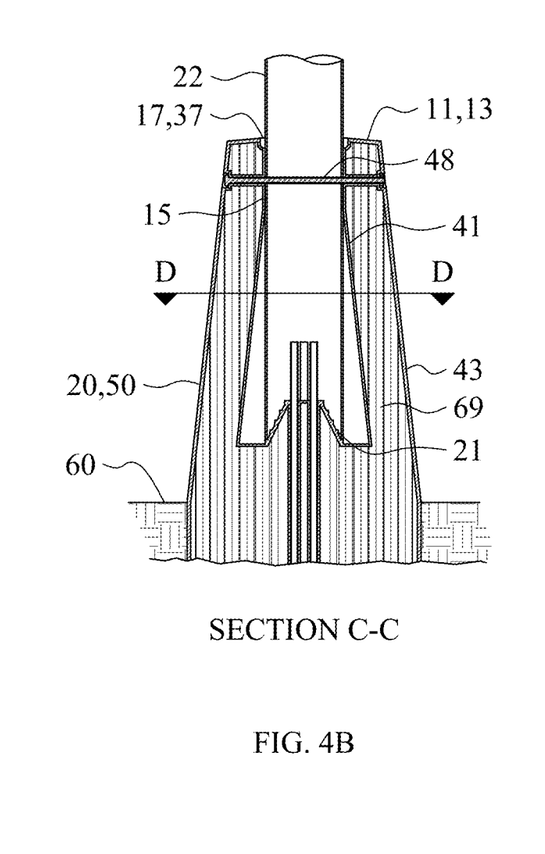

FIGS. 4a and 4b show a partial elevation and a partial section C-C of a pole foundation with coupled straight shaft pole, respectively.

FIG. 4a shows a partial elevation of the foundation's 1 top with a coupled non-tapered pole 22 extending upwardly. The walls of the foundation's 1 top section shown taper inward toward the vertical axial center of the foundation 1 and a straight shafted pole 22 coupled above. The pole 22 is secured to the foundation by a bolt 48 shown located just below the top of the pole cavity 9.

Enclosure covers 79,80 shown disposed on the exterior walls of the foundation 50 can provide access to at least one of: a fluid inlet enclosure and/or a power/data enclosure. Below the bolt's 48 bore 46, the enclosure caps for an electrical receptacle 79 and a fluid inlet 80 are shown. When the foundation's design needs extra weight for ballasting, fluid can be poured through the fluid inlet filling at least in a portion of the cellular formed voids between the foundation's walls and/or the space/s in the volumetric enclosure of the foundation 1.

Through the electrical enclosure 79 shown electrical devices can couple to at least one power conductor in the foundation. For example, an electrical vehicle plug can be coupled to the receptacle of the foundation. Inside the foundation's 1 walls, the vertical cellular wall can be formed to have through fluid and/or power conduits. The conduits can extend between the exterior and/or the interior walls of the foundation thereby allowing conveyance of fluid and/or electrical conductors to or to and from the foundation's 1 interior to the exterior (not shown).

The foundation's tapering walls 50 can be articulated with at least one of: a prefabricated reveal and a recess. In addition, the foundation's exterior surfaces can be painted and/or can be coupled to a laminate. The foundation material can be non-corrosive, non-metallic, can emit little or no harmful gases to the atmosphere, and can withstand the elements in the environment where installed. Further, at least a portion of the materials of the foundation's exterior walls can be different from the materials used to fabricate the interior and can be fabricated and/or applied as a secondary fabrication process.

FIG. 4b section figure shows the top section of a pole foundation 1 with a straight shaft pole 22 extending upwardly from inside the pole cavity 9. The straight shaft pole 22 is shown seated on a tapered structure 21 located at the bottom of the pole's cavity 9. The support base of the straight shaft pole 22 can be configured to extend upwardly from the bottom surface of the pole cavity 9 as shown, can be flush with the bottom surface of the pole cavity 9, or can be recessed with a recess opening that couples the profile of the pole's 22 exterior perimeter walls.

Above, the pole 22 is shown supported by the interior walls of the pole cavity also referred herein as the walls of the pole opening 15. The precise profile, length and thickness dimensions of the pole opening 15 in the pole cavity 9 can be configured by the structural design and fabrication code and/or by human input. The pole opening 15 dimension of the pole cavity 9 is configured to have the pole's 22 exterior perimeter maintain contact with the inner perimeter walls of the pole cavity opening 15.

The section figure shows a built-in slope 13 on the top surfaces 11 of the pole cavity 9. The slope 13 is configured to divert fluid away and toward the exterior walls of the pole cavity 50. The top surfaces 11 of the pole cavity 9 can be unitary fabricated with the pole cavity 9 to include the built-in slope 13. A prefabricated recess 17 around the pole cavity's 9 pole opening 15 shown is configured to receive elastomeric compound 37. The elastomeric compound 37 prevents fluid from entering the pole cavity 9. A through bolt 48 shown couples and secure the pole 22 to the foundation 1. The bolt 48 shown is inserted from a wall of the pole cavity 9 extending through the interior of the pole 22 to the other end.

The tapering pole cavity walls 50 shown are comprised of inner 41 and outer 43 (interior/exterior) walls and vertical cellular walls 69 disposed between. The thickness of the inner 41 and outer 43 walls of the pole cavity 9 can vary in response to internal and external stresses applied to the walls 20. The foundation's tapering walls 50 can be articulated with at least one of: a prefabricated reveal and a recess (not shown). In addition, the foundation's exterior surfaces can be painted and/or can be coupled to a laminate (not shown). It is noted that at least a portion of the materials of the foundation's exterior walls 50 can be different from the materials used to fabricate the interior and can be fabricated and/or applied as a secondary fabrication process.

The vertical cellular walls 69 shown disposed between the inner 41 and outer 43 walls of the pole cavity walls 20 and/or the entire foundation 1 direct at least a portion of the stresses applied by the pole 22 to the outer walls 50 of the pole cavity 9. From the pole cavity inner wall 41 the stresses are conveyed through the cellular vertical walls 69 to the outer walls 43 of the pole cavity 9 and down to the foundation's 1 structure below the terrain 60.

The present section figure shows the vertical cellular walls 69 located at least between the inner 41 and outer 43 walls of the pole cavity 9. These unitarily formed vertical cellular walls 69 intersect and form a radial pattern (when viewed from above) about the vertical axis of the foundation 1. In at least one embodiment the thickness of the vertical cellular walls 69 can vary from one end to the other.

Further, the vertical cellular walls 69 can have at least one opening in the wall (not shown). Fluid can then flow to at least one adjacent cell through such an opening in the vertical cellular wall 69. When additional weight is needed to ballast a foundation 1, fluid dispensed from a fluid inlet 80 above can fill voids formed by the vertical cellular walls 69 and/or spaces inside the volumetric opening/s of the foundation 1 (see FIG. 6B).

The diverging vertical cellular walls 69 are coupled to the foundation's perimeter wall 50. Stresses applied by the pole 22 are conveyed through the diverging vertical cellular walls 69 to the foundation's 1 exterior surfaces 43. Since the walls diverge, the stresses are distributed over an extended surface areas of the foundation's exterior 43. As a result, to maintain the foundation 1 in equilibrium, the counter pressure applied by the surrounding medium 60 on the foundation's 1 exterior surface areas is reduced.

Comparing FIG. 2B, with FIG. 4B, the foundation in FIG. 2B accommodates a tapered pole with a wider base than an upper portion. Thus, because the base of the pole 22 is wider than an upper portion of the pole, a size of a void that can accommodate the outer diameter of the pole 22 results in a gap near the upper portion of the foundation once the pole 22 is set in the foundation. This gap is largely filled with by the cap 100. A cap 100 is optional in the embodiment of FIG. 4B, where a pole of constant outer diameter is set in the foundation. Moreover, the opening at the top of the foundation may be set to match the outer diameter of the pole so a cap is not needed to make a tight fit.

FIGS. 5A, 5B, 5C, and 5D show an elevation, a section, a top view, and a bottom view of a pole cap 100, respectively.

FIG. 5A shows an elevation of the pole cap 100. The pole cap 100 can be a unitarily fabricated element configured to distribute at least a portion of the stresses applied by the pole through its outer vertical walls 83 to the inner walls of the pole cavity. The pole cap 100 is also a pole cavity cover 94 covering the top wall surfaces of the pole cavity. The pole cap cover 94 is configured to prevent fluid ponding with a sloped down profile 93 originating in proximity to the inner opening of the pole cap 85 and terminating at the outer perimeter of the pole cap 100.

The pole cap 100 can be fabricated of hardened material with or without cellular openings comprising at least one member. The present figure shows a two-member pole cap 100. The pole cap/cover 94,100 can be made of non-corrosive, and/or non-metallic material that is stable against thermal expansion that can withstand harsh environmental conditions including solar UV radiation.

FIG. 5B shows a top view of the pole cap cover 94. A recess 88 shown along the perimeter inner vertical walls of the cap 85 is configured to receive elastomeric material 37 that prevents fluid from entering the pole cavity. The dashed lines beyond represent the outer vertical walls 83 of the pole cap cover 94. The vertical walls (not shown) are couple to a pole and their outer surfaces couple to the inner walls of the pole cavity. Each of the two members 99 of the pole cap cover 94 show in dashed lines a bore 46. When the pole cap members 99 couple, the bores 46 align with one another. The bores 46 are configured to receive a through bolt.

Figure 5C:
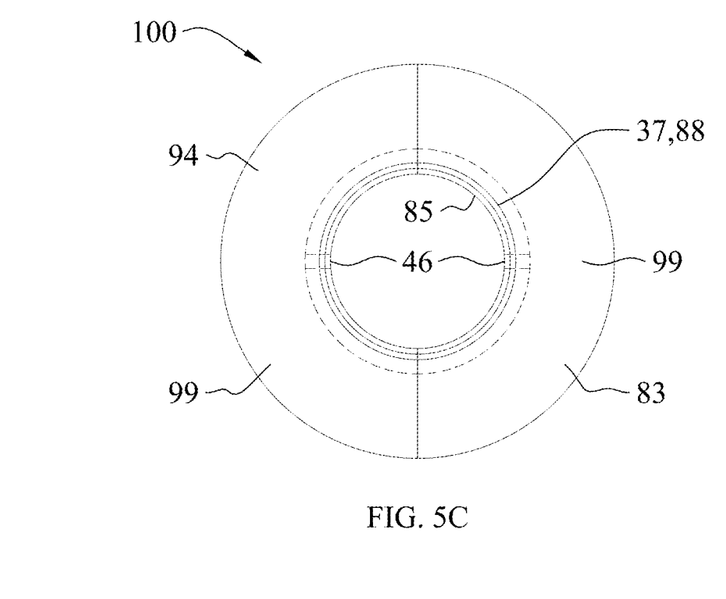

FIG. 5C shows a transverse vertical section through the pole cap/cover 94, 100. At the top, a recess 88 shown along the cap inner vertical wall 85 is configured to receive elastomeric material 37 that prevents fluid from entering the pole cavity. A slope extending down from the top of the recess is configured to direct fluid away from the pole opening of the pole cap/cover. At the bottom side of the pole cap's cover 94 in proximity to the pole cap cover 94 outer perimeter, a continuous groove 84 in the cover prevents fluid from entering the space between the cap's cover 94 and the top surfaces of the pole cavity.

In proximity to the mid-height of the pole cap 100 through bores 46 are shown in the vertical walls 83, 85. The bores 46 can be threaded or un-threaded. A bolt (not shown) inserted from at least one exterior surface of the pole cavity wall extends through the pole cap 100 vertical walls 83, 85 and a wall of a pole securing the pole to the foundation. The number of bolts and the pole cap/cover dimension and structural design can be configured concurrently with the design of the foundation. The inner vertical walls of the pole cap 100 can be code configured to precisely couple to the selected pole tapering or non-tapering walls' angle.

Figure 5D:
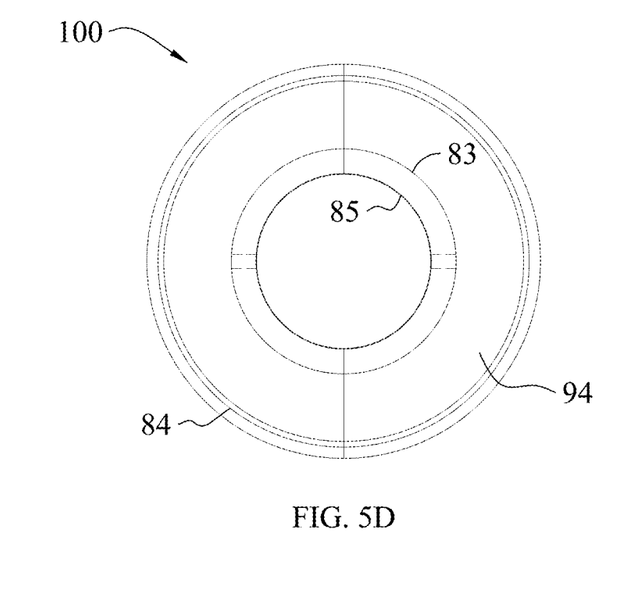

FIG. 5D shows the bottom view of the pole cap cover 94. The pole cap 100 inner vertical walls 85 couple to a pole. The pole cap 100 outer vertical walls 83 couple to the inner walls of a pole cavity. Perpendicular bores 46 shown (in dashed lines) are configured to receive at least one through bolt. In proximity to the outer perimeter of the cover 94 of the pole cap 100, a continuous groove 84 shown is configured to prevent fluid from entering the pole cavity through a gap between the pole cap cover 94 and the top of the pole cavity walls. The outer perimeter of the pole cap cover 94 can extend overhanging beyond the outer diameter of the pole cavity.

FIGS. 6A and 6B show horizontal section B-B and D-D through a pole cavity of a tapered foundation and a partial perspective enlargement of a section of the pole cavity.

Above grade, the present figures show the pole cavity outer walls 43 tapering inward toward the vertical axial center of the foundation 25. The profile of the pole cavity 9 is round. In another embodiment, the walls of the pole cavity 9 can be segmented forming different pole cavity 9 profiles. In yet another embodiment, the walls of the pole cavity 9 can extend straight upwardly. The pole cavity 9 retains tapered poles with pole cap acting as intermediary. The pole cap can also be used with straight shafted pole. However, the pole cavity 9 retaining a straight shaft pole can forgo using a pole cap/cover.

FIG. 6B shows a horizontal section through the pole cavity 9. The section can be common to both types of foundations supporting tapered and non-tapered poles. The pole cavity 9 is a voided opening configured to sit a pole inside (not shown). The pole cavity walls 20 of the present innovation comprise thickened inner 41 and outer 43 walls with a plurality of vertical cellular walls 69 forming a cellular structure between.

The vertical cellular walls 69 are arranged in a repeated curved incremental pattern about the vertical central axis of the foundation 25. These curved walls 69 are arranged in a clockwise and counterclockwise pattern. As the walls 69 intersect, they form the cells 73. As the curved wall distance grows from the vertical axial center of the foundation 25, the size of the formed cells 73 grows. The cells 73 are configured to absorb, convey, and distribute the pole applied stresses over extended areas of the foundation's exterior wall surfaces 43. As the contact area of the foundation grows, the stresses applied on the foundation surfaces is reduced.

The thickness of the vertical cellular structural walls 69 forming a plurality of cells 73 between the inner 41 and outer 43 walls of the pole cavity 9 can vary based on at least one of: specific environmental conditions and pole design loads. The walls 69 can be solid or perforated (not shown). Perforated walls reduce the foundation's weight and material. In addition, fluid poured through an inlet in the exterior surface 43 of the pole cavity 9 can travel through the vertical cellular walls 69 from one cell 73 to another (not shown). Where additional foundation weight is needed, fluid added through the fluid inlet can fill a portion of or the entire volume of the voids between the vertical cellular walls 69 structure and/or the volumetric openings of the foundation (not shown).

FIG. 6B shows an enlarged segment of the pole cavity 9 vertical cellular wall 69. The enlarged segment shows the outer wall of the pole cavity 43 thicker than the inner wall 41. The outer wall 43 is configured to withstand counter pressure applied on the foundation by the surrounding medium. The outer cells' 73 size of the vertical cellular walls 69 are shown to be greater than the inner cells' 73 size. Cellular wall openings 77 shown in the vertical cellular walls 69 are configured to convey fluid from one cell 73 to an adjacent cell. The openings 77 can reduce the use of material and fabrication time without compromising the structural integrity of the foundation's structure.

Figure 7A:
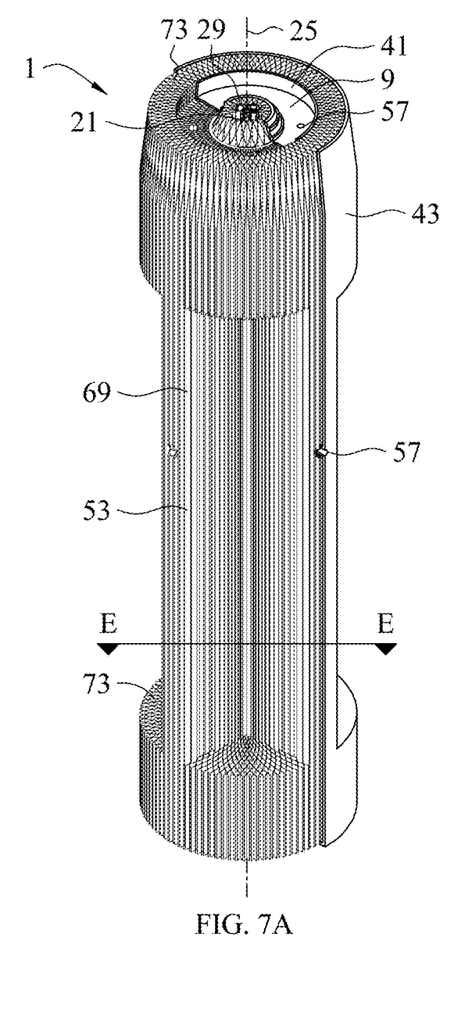
FIGS. 7A and 7B show partial perspective views of a crossed shaped foundation employing cellular vertical walls, and a partial perspective view of a volumetric shaped foundation employing spiral cellular walls respectively.
Figure 7B:
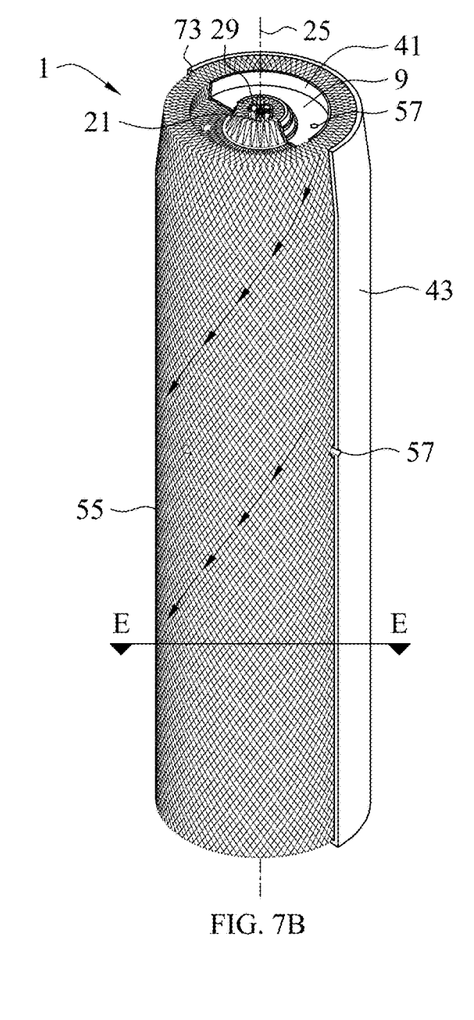

FIGS. 7A and 7B show partial perspectives of a crossed shaped foundation employing cellular vertical walls and a volumetric shaped foundation employing spiral cellular walls, respectively. Both perspective views are taken from above the tapered structure of the pole cavity.

FIG. 7A shows a partial perspective of a crossed shaped foundation structure 53. The partial top perspective view shows a horizontal cross-section of the foundation 1 taken at the bottom of the pole cavity 9 above the tapered structure 21. Across the central vertical axis of the foundation 25 to one side, the exterior walls of the foundation 43 are shown removed. The removed exterior walls 43 show the unitarily fabricated internal vertical cellular walls 69 of the foundation 1. The vertical cellular walls form diamond shaped cells 73. The cells 73 grow as the cellular vertical walls 69 extend outwardly for the inner wall of the pole cavity 41.

It is noted that the fabrication of the exterior wall of the foundation can be done as a secondary process. Also, the material used to fabricate the exterior wall of the foundation 1, in part or whole, can be different from the material used to fabricate the interior structure of the foundation 1 and/or the cap (not shown).

Other elements shown include a tapered structure 21, weep holes 57 inside the pole cavity 9, weep hole 57 egress openings at mid-height of the foundation 1, electrical conduits 29 extending out from the tapered structure 21, and a section E-E designator.

FIG. 7B shows a partial perspective of a volumetric shaped foundation 55. The partial top perspective view shows a horizontal cross-section of the foundation 1 taken at the bottom of the pole cavity 9 above the tapered structure 21. Across the central vertical axis of the foundation 25 to one side, the exterior walls 43 of the foundation 1 are shown removed. The removed exterior walls 43 show the unitarily fabricated internal vertical cellular walls 69 of the foundation 1. The vertical cellular walls 69 form diamond shaped cells 73 across the horizontal section and vertical surfaces of the foundation 1. At least the horizontal cells 73 can grow as they extend outwardly from the inner wall 41 to the outer walls 43 of the pole cavity 9 and the foundation 1.

The diamond form cells 73 patterns shown along the surfaces of the foundation is shown spiraling down about the foundation's central vertical axis 25. The spiraling walls around the foundation convey the stresses away from the location where the stresses are applied on the pole cavity 9 inner wall/s 41. By so doing, the stresses distributed over extended areas of the foundation's 1 exterior surfaces 43 are at least in part non-coaligned with where the pole stresses first applied. Re-distributing the stress away from a location where first applied can reduce the counterbalancing pressure needed to be applied by the foundation's surrounding medium to maintain the foundation 1 in equilibrium.

It is noted that the fabrication of the exterior wall 43 of the foundation 1 can be done as a secondary process. Also, the material used to fabricate the exterior wall 43 of the foundation 1, in part or whole, can be different from the material used to fabricate the interior structure of the foundation and/or the cap (not shown).

Other elements shown include a tapered structure 21, weep holes 57 inside the pole cavity 9, weep hole 57 egress openings at mid-height of the foundation 1, electrical conduits 29 extending out from the tapered structure 21 and a section E-E designator.

Figure 8A:
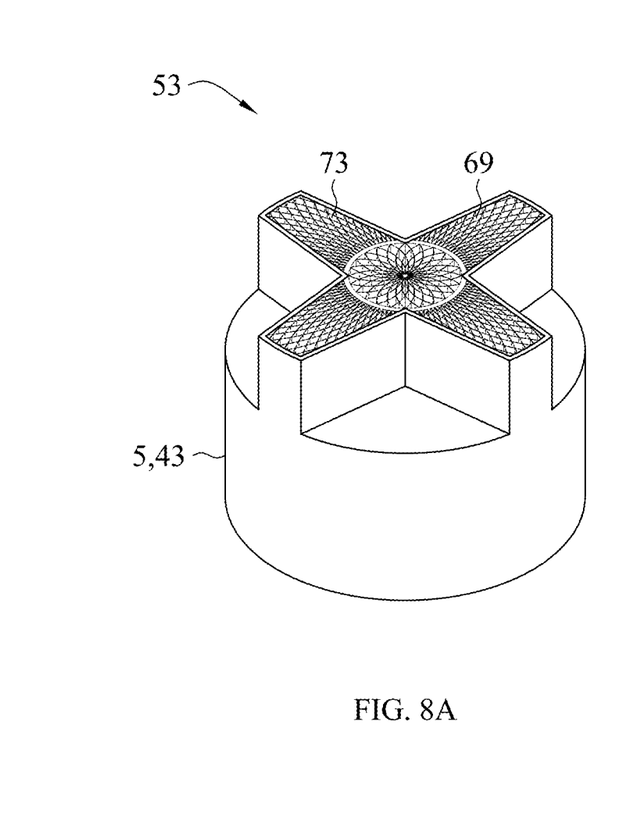
FIGS. 8A and 8B show horizontal sections through a cellular crossed shaped foundation and a section through a volumetric shaped foundation employing cellular walls spiraling down, respectively.
Figure 8B:
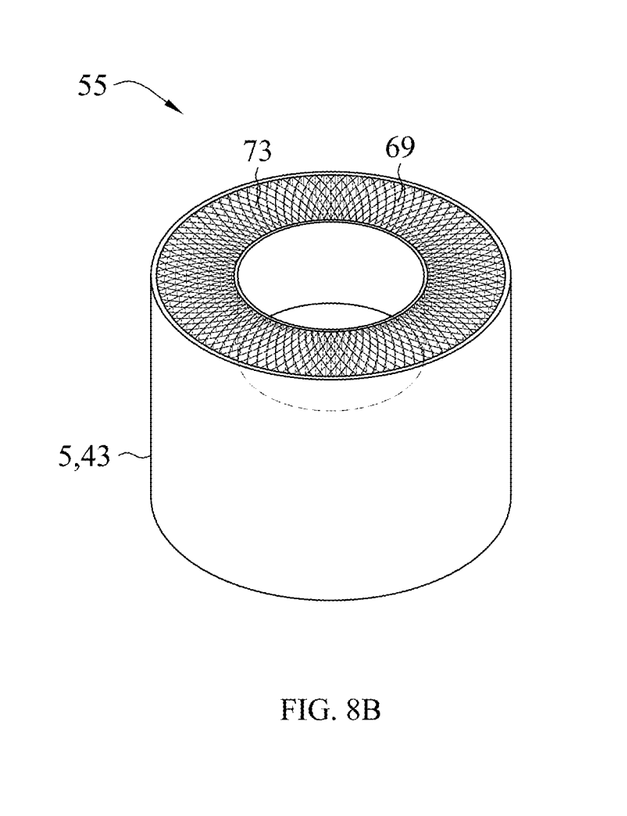

FIGS. 8A and 8B show perspective sections' E-E views of the crossed shaped foundation 53 and of the volumetric shaped foundation 55 base section 5 respectively. The cross shaped foundation employs spiral cellular walls design pattern. Both perspective views are horizontal cross-sections taken from above the foundation's 1 base.

FIG. 8A shows the crossed shaped foundation 53 employing vertical cellular walls 69 pattern. FIG. 8B shows the volumetric shaped foundation 55 employing both cellular vertical walls and spiraling cellular walls. The vertical cellular walls 69 regardless on the foundation 1 form are configured to distribute the poles' applied stresses over extended areas of the exterior wall surfaces area of the foundation 43. These intersecting vertical cellular wall 69 types, radiating angle, increments, cell pattern and wall thickness can vary. The foundation structure design and fabrication described in this application is a technological advancement that decades ago was not possible.

The prefabricated foundation comprising inner and outer walls with internal vertical walls that form cellular structures, radiating or radiating and spiraling from the axial vertical center of the foundation 25, reduces:

The foundation's overall weight
The foundation's material volume
The foundation's material cost
The foundation's fabrication time
The foundation's shipping cost
The foundation's installation time
Installation scheduling control through prefabrication.
The savings are generated through interaction between human and machine. The machine has real time access to the inputs critical for the design and production of the foundation. Inputs processed by an AI code operated processor configures best design for the cellular or cellular and volumetric pole foundation. The design is based on local environmental conditions, product specifications, jurisdiction design guidelines, and designer preferences.

List of Elements

| | | | |
|---|---|---|---|
| 1. | Foundation | 5. | Base Section |
| 9. | Pole Cavity | 11. | Pole Cavity Top surface/s |
| 13. | Sloped Surface | 15. | Pole Cavity Opening |
| 17. | Recess | 20. | Pole Cavity Wall/s |
| 21. | Tapered Structure | 22. | Pole |
| 25. | Foundation's Vertical Axis | 29. | Conduit/Conductor |
| 37. | Elastomeric Compound | 41. | Pole Cavity Inner Wall |
| 43. | Pole Cavity Outer Wall | 46. | Bore |
| 48. | Bolt | 50. | Foundation/pole cavity Exterior Tapered Wall |
| 53. | Foundation Cross Structure | 55. | Foundation Volumetric Structure |
| 57. | Weep Hole | 60. | Terrain/medium |
| 69. | Vertical Cellular Wall | 70. | Cellular Structure |
| 73. | Cell/s | 75. | Fluid |
| 77. | Cellular Wall Opening/s | 79. | Electrical Enclosure Cover |
| 80. | Fluid Enclosure Cover | 83. | Cap Outer Wall |
| 84. | Back Flow Groove | 85. | Cap Inner Wall |
| 86. | Lip | 87. | Seam |
| 88. | Cap Recess | 89. | Top Lip |
| 90. | Void | 93. | Cap Sloped Surface |
| 94. | Pole Cap Cover | 96. | Bottom Face of Cap Cover |
| 98. | Bore | 99. | Cap Member |
| 100. | Pole Cap | | |

The invention claimed is:

1. A prefabricated load bearing structural assembly comprising:
    a pole having a first bottom section and a second section of the pole disposed above the first section;
    a cap having inner vertical walls and outer vertical walls; and
    a foundation having a pole cavity therein that is sized to receive the first bottom section of the pole therein, the cap being sized to fill a gap between an outer surface of the pole and an inner surface of the pole cavity, the foundation is unitarily fabricated with vertical internal cellular walls configured to transfer lateral and axial stresses away from the pole through the cap, wherein
    the first bottom section of a pole rests on a centrally located structure at a bottom of the pole cavity,
    the inner vertical walls of the cap abut a perimeter of the second section of the pole,
    the outer vertical walls of the cap abut inner walls of the pole cavity,
    cells of the vertical internal cellular walls of the foundation are arranged in a clockwise and counterclockwise radiating curved pattern about a vertical axial center of the foundation, the vertical internal cellular walls intersect and diverge from one another as well as extend outwardly toward a surface of the pole cavity such that at least a portion of stresses applied by the pole are distributed by the vertical internal cellular walls over extended exterior surface areas of the foundation, and the extended exterior surface areas of the foundation receive stresses applied by the pole so as to reduce counter pressure imparted by surrounding medium to maintain the foundation in equilibrium.

2. The prefabricated load bearing structural assembly of claim 1, wherein the vertical internal cellular walls each include a through opening sized to permit a fluid flow from at least one cell to an adjacent cell.

3. The prefabricated load bearing structural assembly of claim 1, wherein at least one wall of the vertical internal cellular walls spirals about a vertical axis of the foundation from a top of the pole cavity downward.

4. The prefabricated load bearing structural assembly of claim 1, further comprising a threaded bolt that extends horizontally from at least one exterior side of the pole cavity through the cap and beyond at least one wall of the pole so as to secure the pole and the cap to the foundation.

5. The prefabricated load bearing structural assembly of claim 1, wherein a thickness of an exterior wall of the foundation and/or the vertical internal cellular walls varies.

6. The prefabricated load bearing structural assembly of claim 1, wherein walls of the pole cavity taper inward toward the vertical axial center of the foundation from grade level upwardly.

7. A prefabricated load bearing structural assembly comprising:
    a foundation having a pole cavity therein; and
    a pole having a first bottom section and a second section disposed above the first section, the first bottom section is sized to fit within the pole cavity, wherein
    the foundation is unitarily fabricated with vertical internal cellular walls configured to transfer lateral and axial stresses applied by the pole to the foundation,
    the first bottom section of a pole rests on a centrally located structure at a bottom of the pole cavity,
    the second section of the pole having a perimeter that abuts a wall of the pole cavity,
    cells in the vertical internal cellular walls are arranged in a clockwise and counterclockwise radiating curved pattern about a vertical axial center of the foundation, the vertical internal cellular walls intersect and diverge from one another as well as extend outwardly toward a surface of the pole cavity such that at least a portion of stresses applied by the pole are distributed by the vertical internal cellular walls over extended exterior surface areas of the foundation, and the extended exterior surface areas of the foundation receive stresses applied by the pole so as to reduce counter pressure imparted by surrounding medium to maintain the foundation in equilibrium.

8. The prefabricated load bearing structural assembly of claim 7, wherein the pole is secured to the foundation by a bolt that extends through at least one wall of the pole.

9. The prefabricated load bearing structural assembly of claim 7, wherein a volume of voids of the cells in the vertical internal cellular walls constitute at least 5% of an overall volume of the foundation.

10. The prefabricated load bearing structural assembly of claim 7, wherein a weight of the cellular foundation is at least 5% less than another foundation of same size, shape and material as the foundation but without the cells.

11. The prefabricated load bearing structural assembly of claim 7, wherein the vertical internal cellular walls include a through opening sized to permit a fluid flow from at least one cell to an adjacent cell.

12. The prefabricated load bearing structural assembly of claim 7, wherein a thickness of an exterior wall of the foundation and/or the vertical cellular walls varies.

13. The prefabricated load bearing structural assembly of claim 7, wherein walls of the pole cavity taper inward toward the vertical axial center of the foundation from grade level upwardly.

14. A prefabricated load bearing structural foundation comprising:
interior and exterior foundation walls with a plurality of vertical internal cellular walls therebetween, wherein
the foundation is unitarily fabricated with the plurality of internal cellular walls configured to transfer and redistribute lateral and axial stresses applied from above by a pole having a first bottom section that is disposed in a pole cavity of the foundation and that rests on a centrally located structure at a bottom of the pole cavity, a second section of the pole that is disposed above the first section abuts a pole cap or at least one wall of the pole cavity,
at least a portion of stresses applied by the pole are conveyed directly or through the pole cap to an inner wall of the pole cavity,
cells of the vertical internal cellular walls of the pole cavity are arranged in clockwise and counterclockwise radiating curved pattern about a vertical axial center of the foundation, the vertical internal cellular walls intersect and diverge from one another as well as extend outwardly toward an exterior wall of the pole cavity,
walls of the plurality of vertical internal cellular wall collectively spiral about the central axis of the foundation from a top of the pole cavity downward such that at least a portion of stresses applied by the pole are distributed by the vertical internal cellular walls over extended exterior surface areas of the foundation, and
the extended exterior surface areas of the foundation receive stresses applied by the pole so as to reduce counter pressure imparted by the surrounding medium to maintain the foundation in equilibrium.

15. The prefabricated load bearing structural assembly of claim 14, further comprising a threaded bolt that is horizontally disposed and secures at least one of the pole and the cap to the foundation.

16. The prefabricated load bearing structural assembly of claim 14, wherein an exterior wall of the pole cavity that is in proximity to grade level tapers inward toward a central vertical axis of the foundation.

17. The prefabricated load bearing structural assembly of claim 14, wherein at least one vertical internal cellular cell wall spirals about the central axis of the foundation from a top of the pole cavity downward.

18. The prefabricated load bearing structural assembly of claim 14, wherein a through opening is located inside each the vertical internal cellular walls to provide for at least one of fluid passage between adjacent cells and an electrical conductor connectivity.

19. The prefabricated load bearing structural assembly of claim 14, further comprising the pole cap, the pole cap
conveys at least a portion of lateral loads of the pole to at least one of the vertical internal cellular walls, and
at least partially covers the pole cavity.

\* \* \* \* \*